E. MILTNER.
APPARATUS FOR THE MANUFACTURE OF CELLULOID HANDLES.
APPLICATION FILED MAY 21, 1910.

1,052,082.

Patented Feb. 4, 1913.

4 SHEETS—SHEET 4.

WITNESSES:
Julius Hintz
Arthur Marion.

INVENTOR
Ernest Miltner
BY Chas. E. Gill
ATTORNEY

UNITED STATES PATENT OFFICE.

ERNEST MILTNER, OF NEWARK, NEW JERSEY, ASSIGNOR TO RUBBER & CELLULOID HARNESS TRIMMING CO., OF NEWARK, NEW JERSEY, A CORPORATION OF NEW JERSEY.

APPARATUS FOR THE MANUFACTURE OF CELLULOID HANDLES.

1,052,082.  Specification of Letters Patent.  Patented Feb. 4, 1913.

Application filed May 21, 1910. Serial No. 562,573.

*To all whom it may concern:*

Be it known that I, ERNEST MILTNER, a citizen of the United States, and a resident of Newark, in the county of Essex and State of New Jersey, have invented certain new and useful Improvements in Apparatus for the Manufacture of Celluloid Handles, of which the following is a specification.

The invention relates to improvements in apparatus for the manufacture of celluloid handles and the like, and it consists in the novel features and combinations of parts hereinafter described and particularly pointed out in the claims.

I present herein the apparatus of my invention as designed for the manufacture of hollow celluloid handles or handle-shells for shaving-brushes. In this manufacture, I place a celluloid tube closed at one end in a die and soften the same therein by heat, after which I expand the tube against the walls of the matrix of the die by means of air under pressure delivered into the open end of the tube, and thereafter cool the hollow handle-shell thus formed by the use of water or the like. The method of manufacturing the handle-shells is described and claimed in an application filed May 21, 1910, for Letters Patent for the same, and the present invention resides in a suitable apparatus or machine adapted for use in carrying out said method and in manufacturing the handle-shells in an efficient and economical manner and in considerable number at each operation of the machine.

The machine of my invention comprises a press having upper and lower sections adapted to receive heating and cooling circulating agents (steam and water) as the case may be required, a die or dies having a plurality of matrices between said sections to receive the celluloid tube-sections from which the handle-shells are to be formed, a series of nozzles for the delivery of air under pressure into the tube-sections, means for supplying said nozzles with the air, and means for effecting the simultaneous movement of the nozzles toward and from the dies.

Figure 1:
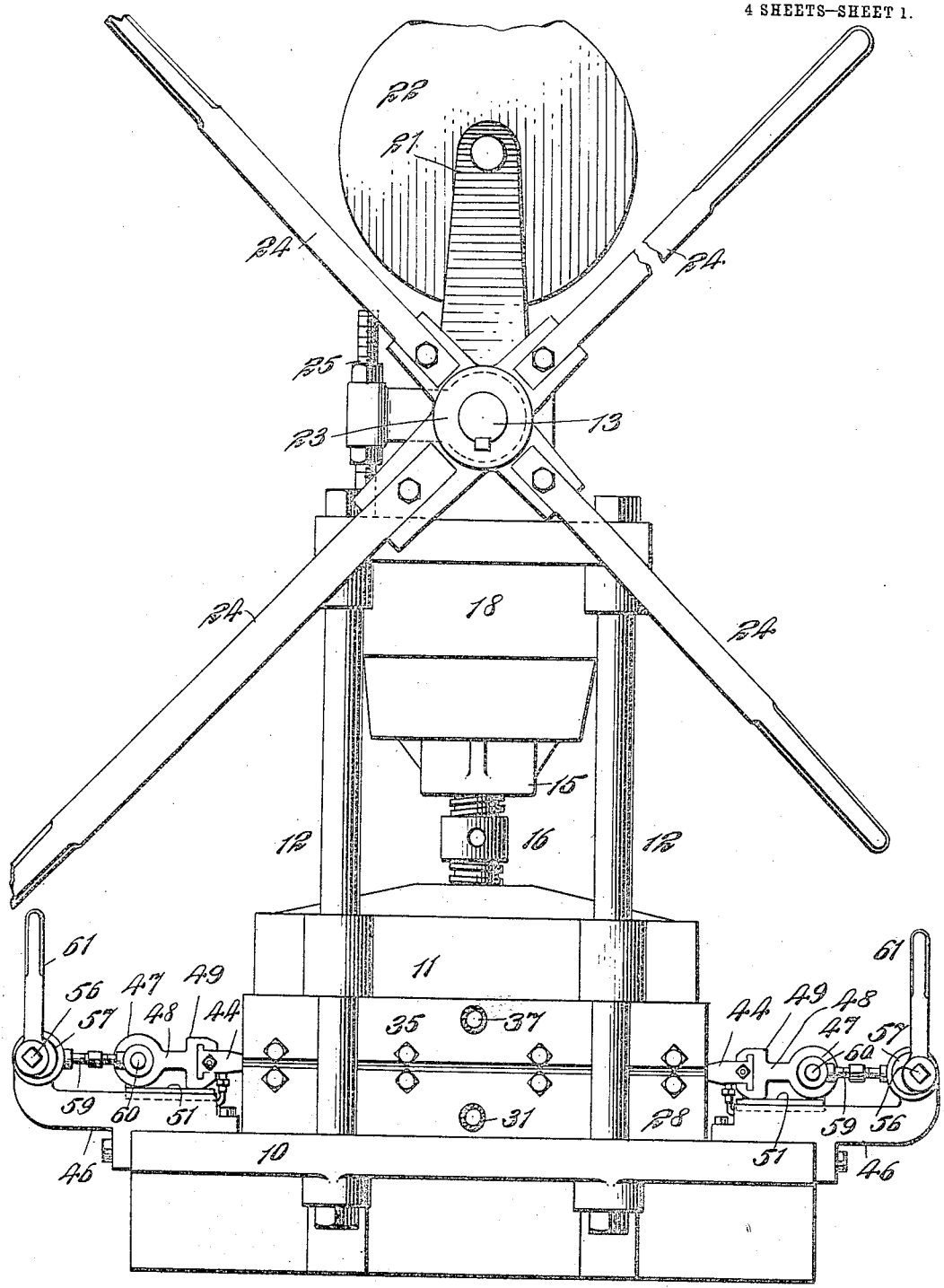
Figure 2:
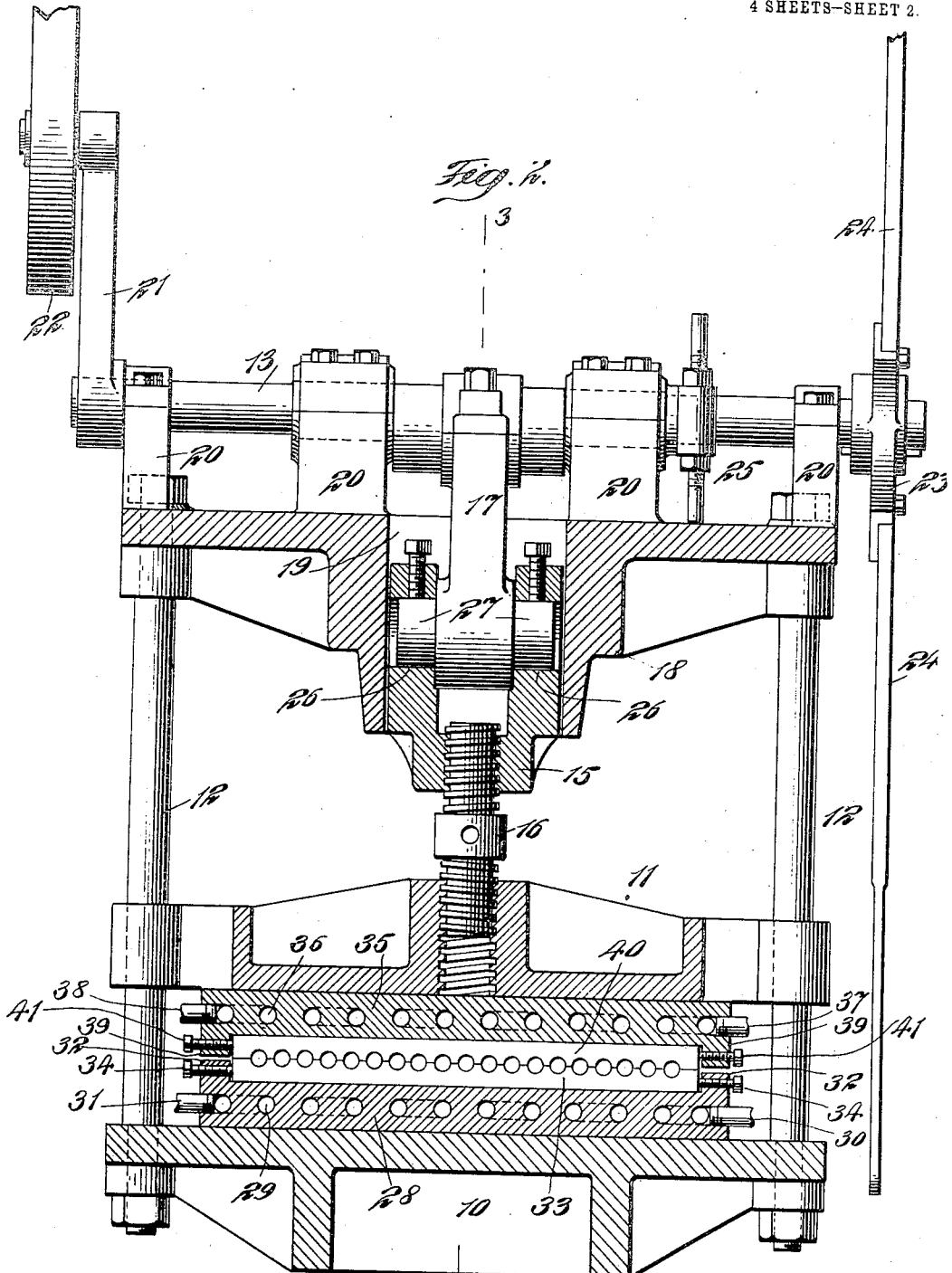
Figure 3:
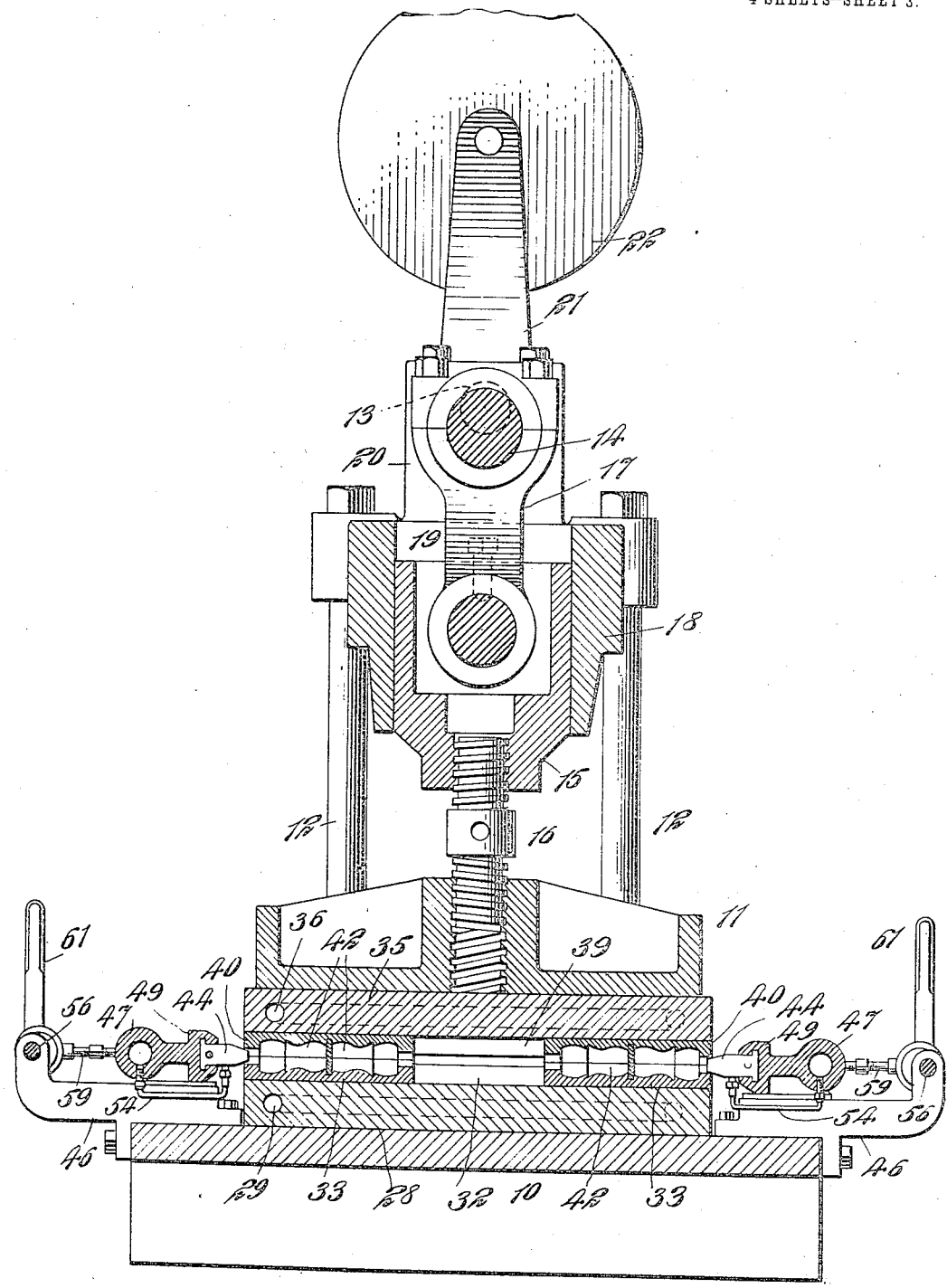
Figure 4:
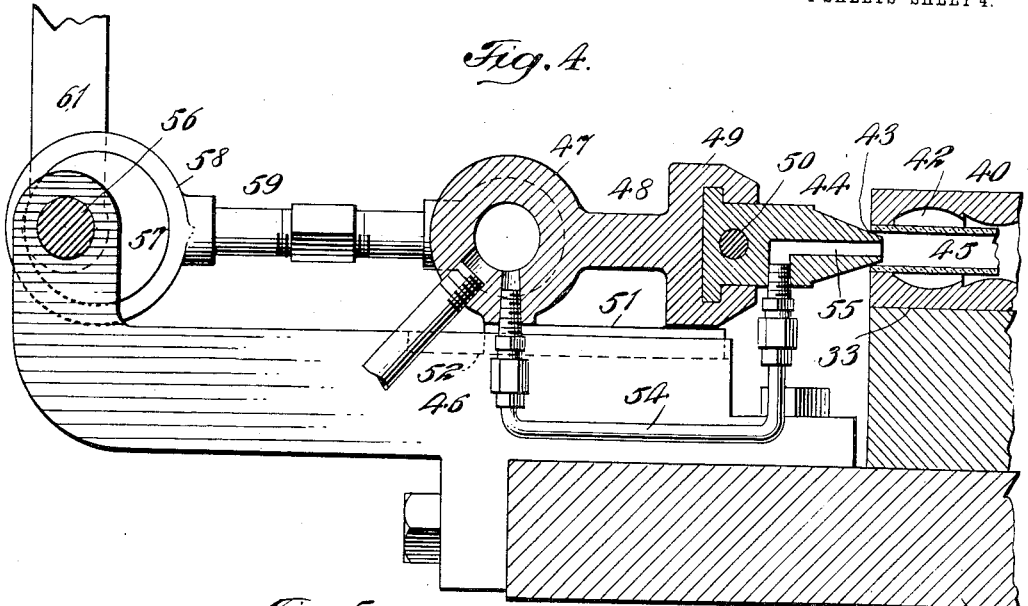
Figure 5:
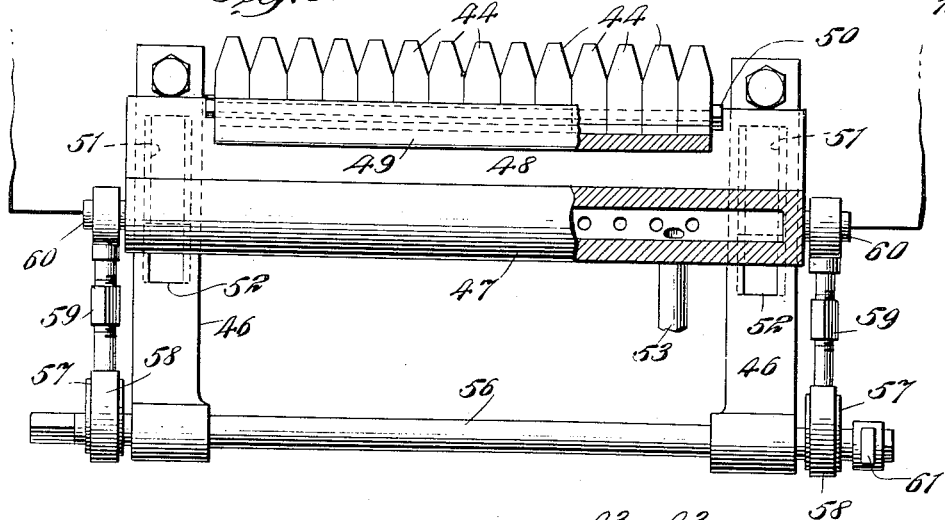
Figure 6:
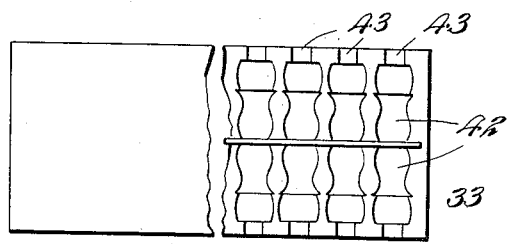
Figure 7:
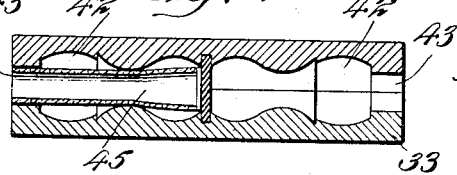

The invention will be fully understood from the detailed description hereinafter presented, reference being had to the accompanying drawings, in which:

Figure 1 is a side view of a machine embodying my invention; Fig. 2 is a front view, partly in vertical longitudinal section, of the same; Fig. 3 is a vertical section of the same on the dotted line 3—3 of Fig. 2; Fig. 4 is an enlarged detached section corresponding substantially with that of Fig. 3, of the means at one end of the press carrying the series of nozzles for delivering air under pressure to the tube-sections held within the matrices of the die; Fig. 5 is a top view, partly in section, of the same; Fig. 6 is a detached top view on a reduced scale and partly broken away, of one of the dies having a series of matrices at each side for the formation of the handle-shells, a part of the top section of the die being removed, and Fig. 7 is a vertical transverse section on a larger scale of the same.

In the drawings, 10 designates the bed of the press, 11 the vertically movable platen thereof, 12 guide rods for said platen, 13 the transverse operating shaft having an eccentric 14 for raising and lowering the platen, 15 a slide connected with the platen by a screw 16 and with the eccentric 14 by an eccentric rod 17, and 18 a suitable frame secured upon the upper ends of the bolts or rods 12 and affording at its central portion a guide-way 19 for the slide 15. The frame 18 supports suitable bearings 20 for the shaft 13 which is provided on one end with an arm 21 carrying a weight 22 and on its other end with a frame 23 to which suitable operating handles 24 are secured, said handles being used by the operator for turning the shaft 13 in one direction or the other and thereby elevating or lowering the platen 11 in a direction from or toward the base 10. The shaft 13 is provided with an adjustable stop 25 to prevent its movement to an undue extent in either direction, said stop being adapted at one end to rest on the frame 18 when the platen 11 is in its lower position and at its other end to engage said frame when the platen is in its elevated position.

The slide 15 is in the form of an open yoke screw-threaded to engage the upper end of the screw 16 and provided with bearing apertures 26 for the ends of the shaft 27 carried by the lower end of the eccentric rod 17. The slide 15 snugly fits without binding against the guideway 19, which is a vertical opening of appropriate form in the center of the frame 18. The screw 16 enables an adjustment of the platen 11 and slide 15 in their relation to each other.

Upon the bed plate 10 is secured a cored plate or frame 28 having a serpentine channel 29 extending through it and equipped at one end with an inlet pipe 30 and at its other end with an outlet pipe 31. The plate 28 is formed at its side edges with upwardly extending flanges 32, the presence of which creates a broad groove in the plate adapted to receive the lower section 33 of the die or dies utilized on the machine, said section fitting between the flanges 32 and being locked in position by means of screws 34 extending through said flanges. Upon the lower side of the platen 11 is secured a plate 35 corresponding exactly with the plate 28 and having the serpentine channel 36 through it equipped at one end with an inlet pipe 37 and at its other end with an outlet pipe 38. The plate 35 has at its side edges flanges 39 corresponding with the flanges 32 of the plate 28 forming a broad groove to receive the upper section 40 of the die or dies which may be used on the press, said upper section of the die or dies being secured in position between the flanges 39 by means of screws 41. When I desire to heat the dies formed of the lower and upper sections 33, 40 I cause steam to flow through the serpentine channels 29, 36 in the plates 28, 35, and at the proper time when it is desired to cool the dies and the handle shells therein, I cease the feed of steam to said channels and cause water to flow through the same, the water serving to cool the plates 28, 35 and the die sections.

In the drawings I illustrate two dies arranged between the lower and upper plate sections 28, 35, and each of these dies extends the full width of the platen 11 and contains a series of matrices 42 conforming to the shape of the handles to be produced, it being my purpose to make at each operation of the machine a considerable number of handles. As a matter of convenience in the manufacture of the dies I provide each die with two sets of matrices 42 arranged end to end, as shown in Figs. 3, 6 and 7, but will only use the outer row of said matrices of each die. The dies are reversible so that either row of matrices therein may become the outer row, and it will frequently be the case that one row of the matrices of a die will differ in outline from another row of said matrices, and under such circumstances the die will be so placed on the machine that the row of matrices intended to be used will be arranged outwardly to coöperate with the air pressure means presently to be described. I do not confine the invention to the employment of two rows of matrices in each die, but in my practice prefer to so construct and use the dies. When the dies are on the press their outer edges are exposed at the front and rear ends of the press sections 28, 35, as shown in Figs. 3 and 4, said dies at their exposed edges having recesses 43 extending from the matrices 42 thereof and exposed to receive the air nozzles 44 by which the air, under pressure, is delivered to the celluloid tube sections 45 placed within said matrices.

The platen 11 of the press is elevated so as to separate the upper section of the die or dies from the lower section thereof when it is desired to place the celluloid tube sections 45 in the matrices of the dies, and in placing said tube sections in the dies the open outer end of the tube sections should be placed within the exposed recesses 43 of the dies so that when the air nozzles 44 are in position to deliver air under pressure within said tube sections, the tapered ends of the nozzles will enter the open ends of the tubes and force the material thereof outwardly against the walls of the recesses 43, thereby forming air-tight joints between said nozzles and tubes, as represented in Fig. 4. After the celluloid tube sections have been placed within the matrices of the lower section 33 of the dies the platen 11 of the press will be lowered to match the upper die section 40 upon the lower section 33 and effect the requisite pressure for maintaining the die sections in proper relation to each other. Steam may thereupon be admitted through the sections 28, 35 for softening the celluloid tube sections held within the dies. After the celluloid tube sections have become sufficiently softened by heat, air under pressure is delivered from nozzles 44 into said tube sections for the purpose of expanding them outwardly against the walls of the matrices 42 and converting them from the condition of a tubular blank closed at one end to a complete integral handle shell of the shape defined by the matrices of the dies, the shape shown being one intended for handles of shaving brushes. After the celluloid tube sections have been expanded by the air under pressure into the handle shells, I cool the dies and said shells by causing water, in lieu of the steam previously employed, to circulate through the channels 29, 36 of the plate sections 28, 35, this cooling of the plate sections resulting in the dies and the handle shells being cooled and in said shells being "set," so that thereafter they will not warp or materially shrink.

The means I provide for handling and manipulating air under pressure to be delivered to the tube sections within the dies, is shown more clearly in Figs. 1, 3, 4 and 5, said means being duplicated at the front and back of the machine, so that one set of the mechanism may be utilized in connection with the die whose recesses 43 are exposed at the front of the machine and the other set employed in connection with the other die whose recesses 43 are exposed at the rear of the machine. Each set of the mechanism provided for the air comprises base frames 46, an elongated cylindrical casing 47 having a forwardly extending web 48 supporting an integral head 49 which receives the shank ends of the series of nozzles 44, said head being formed with an undercut groove to receive the shank ends of the nozzles, which are in individual parts and connected together by a bolt 50. The cylindrical casing 47, web 48, and head 49 are preferably integral with each other and with dove-tail bars 51 disposed adjacent to each end of the cylindrical casing 47 and adapted to have a sliding or reciprocating movement within dove-tail recesses 52 formed in the base frames 46. The cylindrical casing 47 is supplied with the air under pressure through a pipe 53, and said casing by means of a series of pipes 54 is connected with the individual nozzles 44, which have outlet passages 55 through them and are adapted at their outer ends to enter the celluloid tubes 45 held within the dies. The cylindrical casing 47 and head 49 are adapted to have a reciprocating movement toward and from the dies and will be actuated by means of an operating shaft 56 mounted in the outer ends of the side arms or frames 46 and having thereon eccentrics 57 connected by straps 58 and rods 59 with studs 60 projecting from the ends of the casing 47. The shaft 56 is a rock shaft and will be provided with handles or levers 61 for enabling the attendant to conveniently rock the shaft and thereby through the eccentrics and other connections cause the cylindrical casing 47 and its connected parts to have a reciprocating movement toward and from the dies for the purpose of projecting the nozzles 44 into the celluloid tubes when required and withdraw said nozzles from said tubes at the required period.

The invention will be understood from the foregoing description without further extended explanation. The platen 11 is elevated to expose the matrices of the dies and the celluloid tubes are inserted in the outer rows of said matrices, and thereupon the platen is lowered to close the dies. Steam is circulated through the plate sections 28, 35 to heat the dies and soften the celluloid tube sections inclosed therein. After the celluloid tube sections have become sufficiently softened, the handles 61 are operated to move the series of nozzles 44 toward the dies until the tapered ends of said nozzles enter the open ends of the celluloid tubes and press the material thereof outwardly against the walls of the recesses 43 in the dies, and thereupon air under pressure is admitted through the pipe 53 to the cylindrical casing 47, whence it will pass through the pipes 54 to the series of nozzles 44 and thence enter the celluloid tubes and expand the same against the inner walls of the dies, thus transforming said tubes into the appropriate outlines for handles. After the handles have been formed the attendant may cut off the air from the casing 47 and nozzles 44 and by means of the handles or levers 61 retract the nozzles from the dies. The handles will be cooled while within the dies by the circulation of water through the plate-sections 28, 35. After the operation has been completed, the platen 11 will be elevated and the hollow handles or handle shells removed from the dies, and thereupon an additional supply of the celluloid tubes will be placed in the dies and the operation repeated. At each operation of the machine a considerable number of the handle-shells are produced, the number depending on the number of matrices in the dies.

I have employed the term "celluloid" in the foregoing description as denoting the material used by me in manufacturing the handles. Celluloid is a pyroxylin material and the same material is well-known by other commercial names. My invention is not limited therefore to the use of the material technically called "celluloid," and I use the word celluloid in this application as denoting broadly pyroxylin material of the general character of commercial celluloid, or any material of the plastic class capable of use in utilizing my invention.

What I claim as my invention and desire to secure by Letters Patent, is:

1. A machine of the character described for the manufacture of celluloid handles and the like, comprising a press having on its bed and platen respectively plate sections having serpentine channels for the circulation through them of a heating and thereafter a cooling agent, means for delivering said heating agent and then said cooling agent to said channels, upper and lower die sections secured to said plate sections and having matrices open at their outer ends, as at 43, and means for delivering air under pressure to the interior of celluloid tubular blanks to be placed within said matrices for expanding them to the required form, said means comprising a series of nozzles to enter said tubes and force them against the walls of the open ends of said matrices, a head detachably holding said nozzles, a casing connected with said head and to be supplied with air under pressure, independent piping connecting said nozzles with said casing, a base slidably mounting said casing and head, and manually operative means for moving said casing, head and nozzles toward and from said tubes; substantially as set forth.

2. A machine of the character described for the manufacture of celluloid handles and the like, comprising a press having on its bed and platen respectively plate sections having serpentine channels for the circulation through them of a heating and thereafter a cooling agent, means for delivering said heating agent and then said cooling agent to said channels, upper and lower die sections secured to said plate sections and having matrices open at their outer ends, as at 43, and means for delivering air under pressure to the interior of celluloid tubular blanks to be placed within said matrices for expanding them to the required form, said means comprising a series of nozzles to enter said tubes and force them against the walls of the open ends of said matrices, a head having an undercut groove receiving the shank-ends of said nozzles, means binding said nozzles together, a casing connected with said head and to be supplied with air under pressure, independent piping connecting said nozzles with said casing, a base slidably mounting said casing and head, and manually operative means for moving said casing, head and nozzles toward and from said tubes; substantially as set forth.

Signed at Newark, in the county of Essex and State of New Jersey, this 7th day of May A. D. 1910.

ERNEST MILTNER.

Witnesses:
 THOMAS B. DENTON,
 T. H. TAYLOR.